April 12, 1960 W. H. NAU ET AL 2,932,548

APPARATUS FOR REPRODUCTION OF IMAGES

Filed Sept. 21, 1956 2 Sheets-Sheet 1

INVENTORS
WILMER H. NAU
THOMAS E. DORN
BY
Wallace and Cannon
Atty's.

APPARATUS FOR REPRODUCTION OF IMAGES

Filed Sept. 21, 1956 2 Sheets-Sheet 2

INVENTORS
WILMER H. NAU
THOMAS E. DORN
BY
Wallace and Cannon
Atty's.

United States Patent Office
2,932,548
Patented Apr. 12, 1960

2,932,548

APPARATUS FOR REPRODUCTION OF IMAGES

Wilmer H. Nau, Bainbridge Township, Ohio, and Thomas E. Dorn, Clarendon Hills, Ill., assignors to Addressograph-Multigraph Corporation, Cleveland, Ohio, a corporation of Delaware Application September 21, 1956, Serial No. 611,154
7 Claims. (Cl. 346—74)

This invention relates to new and improved apparatus for the reproduction of images; more particularly, the invention relates to a new and improved electrode structure for use in the electrostatic reproduction of images.

Population increases and the ever-spreading use of the printed word to disseminate information, sell goods, collect charges, and perform other functions of similar nature has led to the creation of tremendous address lists which must be utilized periodically in addressing magazines, in printing bills, checks, and other business instruments, and in other similar applications. This development has been accompanied by an ever-increasing demand for higher speeds in the printing or other reproduction devices employed for this purpose. At present, one of the most satisfactory systems entails maintenance of a group of record cards each carrying the complete information necessary for printing of an individual business instrument. The record cards may carry information in the form of punched holes or other similar indicia and may also carry additional information in the form of printed matter. In printing address labels or other instruments from these cards, the printed material may be analyzed by an electro-optical scanning system and then reproduced on a sheet or strip of paper by a facsimile reproduction device; one widely used facsimile system suitable for this type of application is described in Patent No. 2,510,200, issued June 6, 1950, in the name of R. G. Thompson. This and other facsimile systems have thus far met most of the demands for increasing speed in the addressing of business instruments and similar applications, but it now appears that in at least some instances they may be unable to meet future requirements without necessitating an excessive capital investment for the printing apparatus and/or for the facilities for housing that apparatus. In particular, systems of the type described in the Thompson patent, which utilize mechanical vibrators in the reproducing portion of the facsimile system, do not appear well suited to the extremely high reproduction speeds desirable in at least some present and/or foreseeable business printing applications.

In the co-pending application of William L. Adams and Thomas E. Jones, Jr., Serial No. 611,287, filed concurrently herewith, there is described a method and apparatus for the reproduction of addresses and/or other material by a continuous electrostatic image-reproduction process. In the Adams et al. process, one side of a sheet of dielectric material, usually paper, is scanned by an image electrode in accordance with a preselected scanning pattern. The image electrode may be in contact with the dielectric sheet or may be spaced therefrom by a relatively small distance. The image electrode is energized with an image signal of predetermined polarity during scanning to induce on the dielectric sheet an electrostatic charge image corresponding to the image to be reproduced. The image signal may, for example, be a facsimile signal and may be generated by image-analyzing apparatus of the type shown in the Thompson patent. As the dielectric sheet is scanned by the image electrode, the portion of the scanned surface thereof immediately adjacent the scanning electrode is flooded with developer particles to form on that surface a physical image representative of the charge image; the physical image is developed substantially simultaneously with the electrical charge image. The developer may comprise an electroscopic powder, either with or without a granular carrier, or may comprise a liquid mist; virtually any developer suitable for use in the electrostatic printing or photography arts may be employed. The physical image may subsequently be fixed to the dielectric by the application of heat and/or pressure or by other fixing techniques.

The Adams et al. reproduction process is most valuable from an economic standpoint when the dielectric image-receiving material is one of the conventional and extremely economical papers commonly used for labels, checks, payment notices, and other ordinary business instruments; special papers would be extremely undesirable from the standpoint of expense of operation of the system. Consequently, effective operation of the system is to a considerable extent dependent upon the maintenance of a steady supply of developer in the area of the paper being scanned by the image electrode, inasmuch as the electrostatic image is dissipated very rapidly by leakage conduction along the paper surface. Although the problem of an adequate developer supply at the point of image formation is adequately met by the apparatus shown in the Adams et al. application, in which a relatively large area of the paper surface is flooded with developer particles, it is highly desirable to provide a means for affording a constant flow of developer in a restricted area encompassing the image electrode, thereby increasing the efficiency of the process and reducing the demands upon the developer supply with respect to rate of flow and total quantity of developer required.

A principal object of this invention, therefore, is the provision of a new and improved means for supplying the developer particles in an image-reproduction process based upon simultaneous formation of electrostatic and physical images.

Another and more specific object of the invention is the provision, in an electrostatic image-reproducing system, of a means for flowing a steady stream of developer particles onto a restricted area of a dielectric surface immediately adjacent a scanning electrode.

A further object of the invention is a new and improved scanning electrode structure which includes means for developing an electrostatic image formed by signals applied to the electrode, development occurring simultaneously with formation of that image.

It is an additional object of the invention to afford a new and improved apparatus for developing images in an electrostatic image-reproduction system which requires a minimum rate of flow for the developer particles and which inherently minimizes the quantity of developer material required.

Accordingly, the invention is directed to an image electrode structure for use in an apparatus for electrostatic reproduction of images upon a sheet of dielectric material, usually ordinary paper. An image electrode structure constructed in accordance with the invention includes an electrically conductive stylus for scanning the image-receiving sheet in accordance with a preselected pattern. Means are provided for energizing the stylus with an image signal of given polarity representative of image values in an image to be reproduced, thereby establishing an electrostatic charge image on the print-receiving sheet. A developer conduit is mechanically coupled to the stylus for movement therewith; this conduit is provided with an outlet opening located closely adjacent the end of the stylus nearest the dielectric sheet.

Developer particles are discharged through the conduit concurrently with scansion of the sheet by the stylus to flood the sheet with the developer particles in the region immediately adjacent the image electrode and form on the sheet a physical image representative of the charge image substantially simultaneously with formation of the charge image.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figures 1, 6:
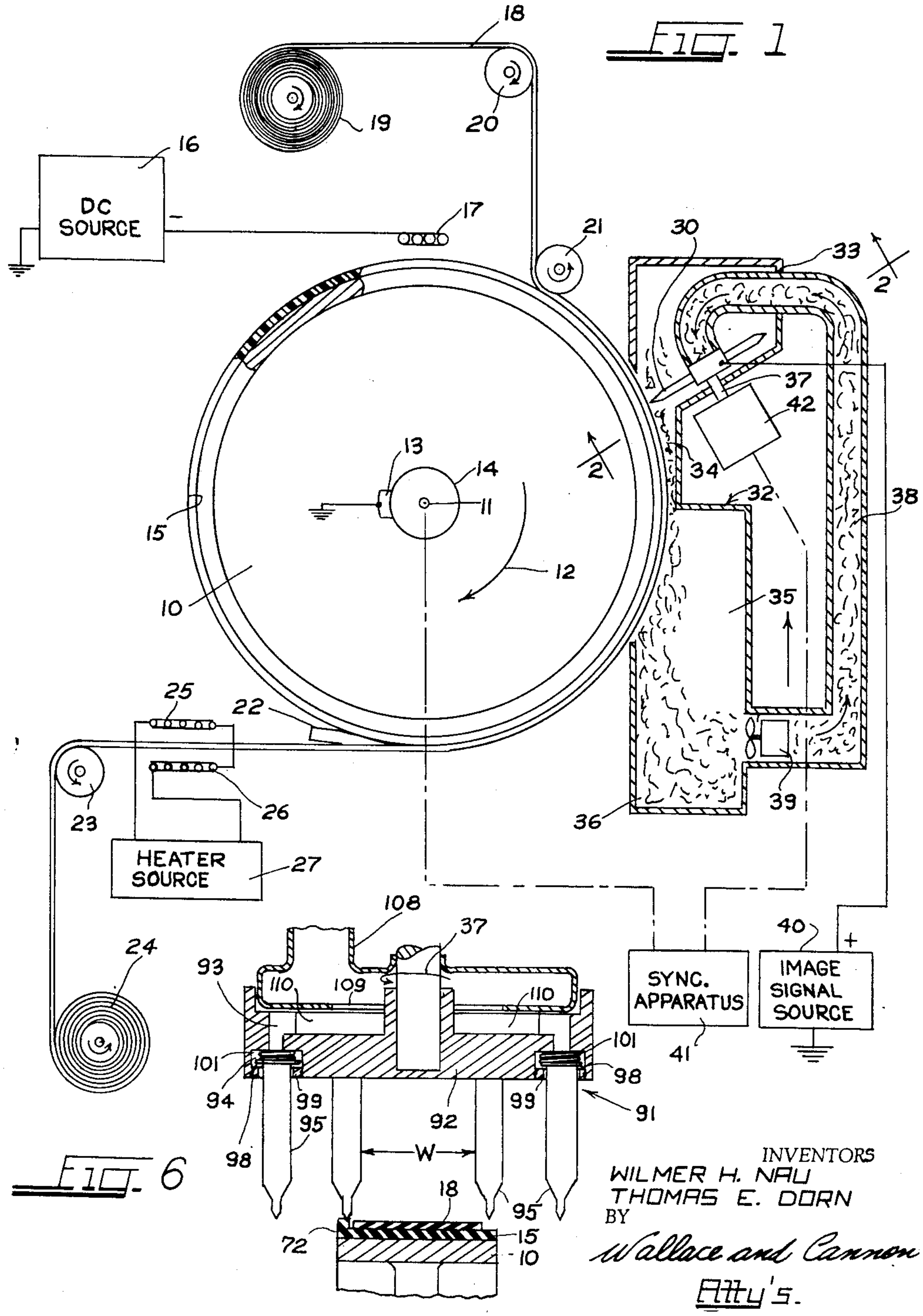
Fig. 1 is a conventionalized elevation view, partly in cross section, of one form of image-reproduction apparatus including an electrode structure and developer supply device fabricated in accordance with the inventive concept.
Fig. 6 is an enlarged sectional view of another embodiment of the inventive electrode structure.

The image-reproduction apparatus illustrated in Fig. 1 includes a conductive printing member 10 comprising a metal drum or cylinder mounted for rotation about a central axis 11, the direction of rotation being indicated in the drawing by arrow 12. Suitable means are provided for maintaining conductive cylinder 10 at a predetermined electrical potential; in the illustrated apparatus, this means comprises a brush or similar device 13 which makes electrical contact with the hub 14 of the drum. In the illustrated embodiment, conductive drum 10 is grounded through brush 13. The external surface of printing member 10 is coated with a layer of dielectric material 15. The particular dielectric selected for the apparatus is not critical and may comprise polystyrene, glass, or any one of a wide variety of resins and other dielectric materials.

The printing apparatus of Fig. 1 further includes a low voltage D.C. source 16 which is connected to a charging grid 17 located closely adjacent the exposed dielectric coated surface of printing drum 10. Grid 17 may, for example, comprise a plurality of relatively fine conductive elements or wires extending transversely of the external surface of drum 10 and is utilized to establish a uniform electrostatic bias potential, preferably of negative polarity, upon dielectric surface 15.

A web 18 of dielectric material, preferably ordinary sulphite paper or the like, is extended from a supply roll 19 over guide rollers 20 and 21 into contact with a portion of the exposed surface of dielectric layer 15. A blade 22 may be utilized to separate web 18 from the drum at a location spaced around the periphery of the drum from roller 21 and the paper web may be passed over a further roller 23 to a storage roll 34. A pair of heater coils 25 and 26 are positioned on opposite sides of the paper web between drum 10 and roller 23 to heat the web after it has been separated from the drum. The heater coils may be energized from a suitable source of A.C. or D.C. power as indicated at 27.

An image electrode 30 is included in the apparatus of Fig. 1 and is located closely adjacent the exposed surface of paper web 18 at a point intermediate guide roller 21 and blade 22 on drum 10. As will be explained more completely hereinafter, image electrode 30 may be in contact with the exposed surface of web 18 or may be spaced from the paper by a relatively short distance. The image electrode is mounted within a developer housing generally indicated at 32 and has an operating shaft 37 extending through one wall of the developer housing to afford a mechanical connection between the electrode and a traversing mechanism here shown as an electrical motor 42. The developer housing 32 comprises three principal sections including an electrode chamber 33 and a receiving or terminal chamber 35 interconnected by a return conduit 34. The terminal chamber 35 contains a supply of electroscopic powder or other developer 36. In addition, a developer conduit 38 interconnects terminal chamber 35 and electrode structure 30 in a manner to be described more completely hereinafter in connection with Figs. 2–5 inclusive. An impeller such as a fan 39 is mounted within the developer conduit to drive developer particles from the terminal chamber to the image electrode.

Image electrode 30 is electrically coupled to an image signal source 40 which may, for example, comprise a facsimile transmitting station of the type described in the aforementioned Thompson patent or may comprise any other suitable source of facsimile-type image signals. Image signal source 40 is controlled by a synchronizing apparatus 41 which is also coupled to printing member 10 and to the traversing mechanism 42 of image electrode 30. In a typical system, in which image analysis and reproduction are carried out at a single location, the synchronizing apparatus 41 may comprise a constant-speed electrical motor employed to drive the image cylinder or helically-apertured analyzing cylinder of the facsimile transmitter 40 along with such other apparatus as may be provided for scanning an image at the transmitter. In a system similar to that of the Thompson patent, in which a record card is advanced at a predetermined speed past a rotating helically-apertured cylinder for analysis, synchronizing apparatus 41 may include the driving mechanism for both the card-advancing apparatus and the apertured-cylinder rotating device. In such an arrangement, synchronizing apparatus 41 may be mechanically connected to drum 10 to rotate the drum at a speed such that its peripheral velocity is approximately equal to or otherwise related to the speed of card advance at the transmitting station. Moreover, the image electrode traversing mechanism 42 may comprise a gear box or other similar speed control mechanism mechanically connected to the rotating drive for facsimile transmitter 40. Both printing member 10 and image electrode 30 are preferably driven at speeds directly related to the operating speeds of the facsimile transmitter.

The image reproduction apparatus of Fig. 1, as thus far described, is in many respects essentially similar to that of the aforementioned Adams et al. application. In placing the apparatus in operation, synchronizing apparatus 41 is energized to initiate movement of printing drum 10 and image electrode 30 at speeds suitably related to the corresponding scanning speeds employed at image signal source 40. As drum 10 rotates, the dielectric layer 15 passes beneath the charging apparatus comprising electrode 17 and is charged to a uniform potential of given polarity; in the illustrated embodiment, the dielectric is charged to a negative polarity. The print-receiving paper web 18 is then brought into contact with dielectric coating 15; inasmuch as the paper web is a relatively poor dielectric, the uniform electrostatic charge applied to coating 15 appears on the exposed surface of the web.

Continuing rotation of the printing drum brings the surface-charged paper web 18 into the printing zone immediately adjacent image electrode 30. The image electrode is energized with the facsimile or image signal from source 40 and, as the paper web passes beneath the image electrode, the signal-modulated electrical field between the image electrode and drum 10 discharges selected portions of the electrostatic charge on the dielectric 15, 18. This action induces on the exposed surface of the paper an electrostatic charge image which is opposite in polarity to the biasing charge applied to the dielectric from electrode 17. Simultaneously, the paper web is flooded with developer particles in the region immediately adjacent electrode 30 as will be described more completely hereinafter in connection with Figs. 2–5. Consequently, a physical image representative of the charge image is formed on the paper surface substantially simultaneously with formation of the charge image. The paper web then continues its movement through the fixing zone established by heater elements 25 and 26 and is ultimately stored on storage roll 24. Excess developer particles which do not adhere to the electrostatic charge image are returned to receiving chamber 35 through the developer return conduit 34.

Figures 2, 3, 4, 5:
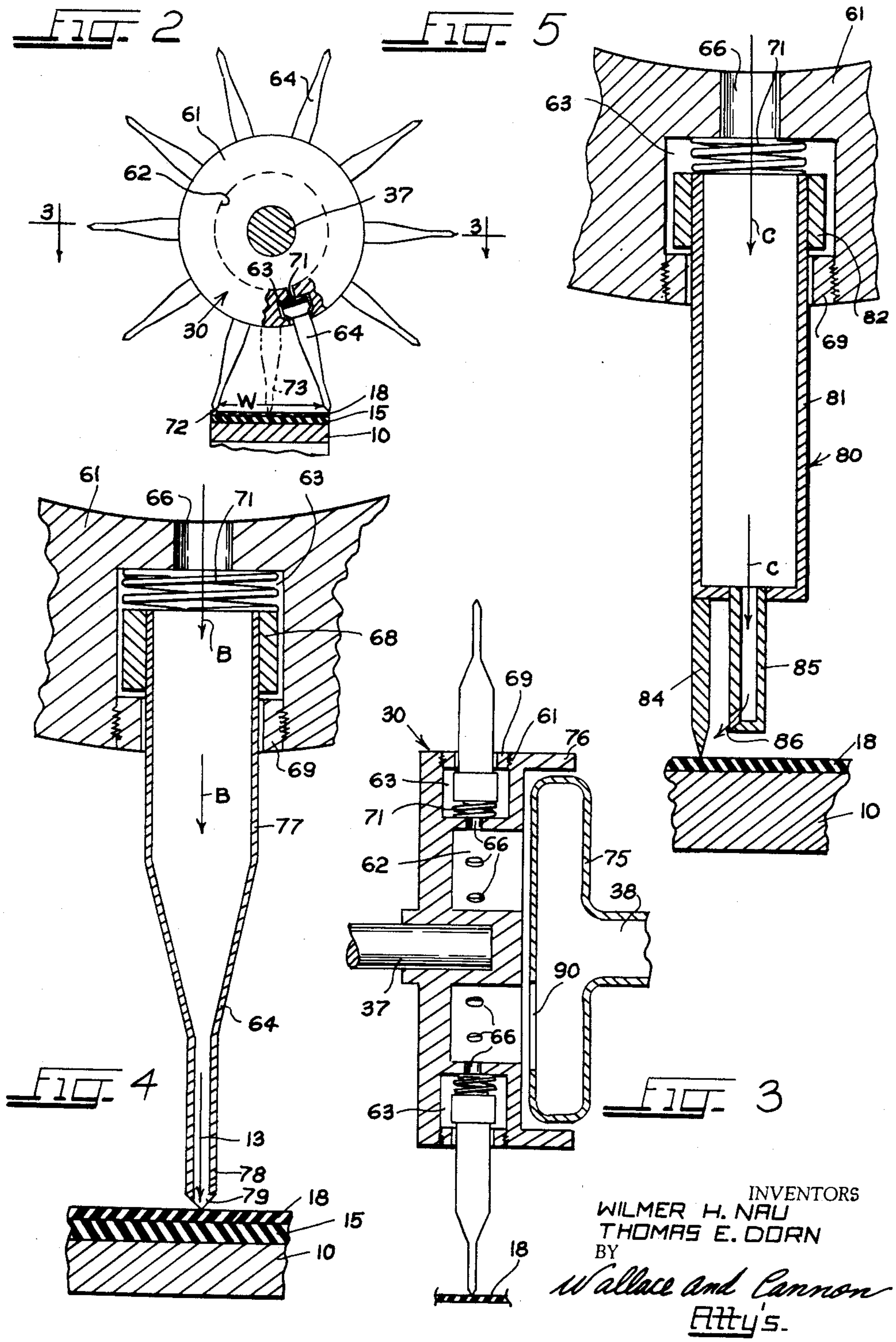
Fig. 2 is an enlarged view of the electrode structure of Fig. 1, taken along line 2—2 therein, a portion of the electrode structure being cut way to show structural details.
Fig. 3 is a cross-sectional view of the electrode structure of Fig. 2, taken along line 3—3 therein.
Fig. 4 is a further enlarged sectional view of a portion of the electrode structure of Figs. 2 and 3, showing the construction of one stylus of the electrode structure.
Fig. 5 is an enlarged sectional view of another form of stylus construction suitable for use in an electrode structure constructed in accordance with the invention.

Figs. 2–4 illustrate one embodiment of the invention which may be utilized for forming the electrostatic and physical images upon paper web 18. As shown in these figures, electrode structure 30 comprises a conductive housing 61 suitably mounted upon shaft 37 for rotation therewith. The conductive housing 61 includes an inner chamber 62 and a plurality of individual stylus-mounting chambers 63 which are spaced around the periphery of the conductive housing in a regular pattern. Each of the stylus-mounting chambers 63 communicates with inner chamber 62, as indicated in Fig. 3, by means of an individual opening 66. A plurality of individual styli 64 are mounted within chambers 63 and extend outwardly from conductive housing 61. As best shown in Fig. 4, each of the styli 64 includes a collar or shoulder element 68 which engages a corresponding shoulder 69 on the external side of mounting chamber 63. Each of the shoulder elements 69 may comprise a ring-shaped element threaded into housing 61; these elements are removably mounted in the conductive housing to permit removal and replacement of styli 64 and to afford a means for limiting radial movement of the styli.

As in the Adams et al. application, styli 64 are radially movable with respect to conductive housing 61 and are normally biased outwardly by a plurality of individual electrically conductive biasing springs 71. Consequently, as shaft 37 rotates, thereby rotating housing 61, the styli are normally maintained in abutment with retainer elements 69 at their maximum extension with respect to conductive housing 61. As indicated in Fig. 2, as each stylus approaches paper web 18, it contacts a shoulder 72 on dielectric layer 15 which absorbs the initial shock of contact with the stylus. Thereafter, continued movement of the stylus with respect to the paper forces the stylus inwardly in chamber 63 through a relatively short distance against the biasing force of spring 71. After the stylus passes the center of the paper web, as indicated in dash outline at 73, the biasing spring forces the stylus outwardly and maintains contact with the paper across the entire surface thereof. Of course, the biasing force exerted by springs 71 upon the individual styli should be relatively small in magnitude to avoid tearing paper web 18; in fact, the biasing springs may be omitted and centrifugal force relied upon to maintain contact between the styli and the paper. Accordingly, the styli scan the surface of paper web 18 in a series of lines, the frequency and spacing of the lines on the paper being determined primarily by the annular velocities of printing drum 10 and scanning electrode 30. As indicated in the Adams et al. application, the peripheral spacing W between adjacent styli is made approximately equal to the width of paper web 18 in order to avoid discontinuities in the scanning pattern, although this requirement may be varied substantially depending upon the nature of the image signal source 40 and the signal supplied to the scanning electrode from that source. As noted in the Adams et al. application, it is not essential that the styli contact the paper; if adequate signal voltages are employed, the styli may perform their scanning function by passing over the paper at a relatively small distance therefrom.

Fig. 3 shows the connection between the developer conduit 38 and the remainder of the image electrode 30. As shown therein, conduit 38 terminates in an enlarged section 75 encompassed by an annular extension 76 of the conductive electrode housing 61; some clearance should be provided between member 76 and conduit section 75 to avoid impeding rotation of the electrode structure. Accordingly, the developer conduit communicates directly with the interior chamber 62 of the electrode structure, and through openings 66, with the individual mounting chambers 63 for the styli. Preferably, the opening 90 in conduit 38 adjacent chamber 62 is of restricted size and is located adjacent the stylus position closest to the paper web 18 to supply most of the developer to the stylus instantaneously scanning the paper. In addition, a plurality of baffles may be arranged within chamber 62 to aid in this action if desired. As shown in Fig. 4, each stylus 64 is of hollow construction and is preferably shaped something like a hypodermic needle. Thus, each stylus 64 includes a relatively wide base section 77 which is necked down a relatively sharp point at 78 and which is provided with a developer outlet opening 79. Accordingly, it will be seen that the developer conduit is effectively continued through each of the styli and communicates directly with the outlet opening 79.

In operation, the developer particles comprising the electroscopic powder 36 or the like are propelled from terminal chamber 35 by the impeller 39 through conduit 38 to the electrode structure 30 (see Fig. 1). The developer particles are forced from the conduit through chambers 75 and 62 and through openings 66 into mounting chambers 63. Movement of the developer particles is continued through the hollow styli as shown by arrows B in Fig. 4 and the particles flow onto paper web 18 in the area immediately adjacent the outlet end 79 of each stylus. Consequently, as an electrostatic charge image is formed on the paper by the electrical signals applied to electrode 30 from source 40, the image is instantaneously developed by the developer material discharged onto the paper through the stylus itself.

Because only one of the several styli included in electrode structure 30 scans paper web 18 at any given instant, additional developer particles are continuously being projected from the remaining styli in a direction away from the paper web. Additional developer particles may escape through the gap separating elements 75 and 76. These particles are caught in chamber 33 of developer housing 32 and return to terminal chamber 35 through return conduit 34. In addition, the developer particles which do not adhere to the paper web because they are discharged from the stylus at a time when it overlies the web but when no signal is applied to the image electrode are returned through conduit 34 to chamber 35.

Inasmuch as the developer employed must be one which will adhere to a charged surface where the electrostatic charge is of given polarity, and in view of the fact that image signals of that given polarity must be applied to image electrode 30 in order to establish the desired charge image on the paper web, the developer particles might be expected to collect on the internal surfaces of the electrode structure and thus eventually clog the developer passageway within each stylus, thereby rendering the apparatus inoperative. Actually, this does not occur. Assuming that the developer particles are negatively charged or carry no charge and that a positive-going signal is applied to the electrode, as indicated in the embodiment of Fig. 1, some of the developer particles are attracted to and adhere to the internal surfaces of the electrode whenever a positive signal pulse is applied thereto. This effect is momentary, however, since the electrode structure may be maintained at ground potential or at a negative potential except during intervals which coincide with the occurrence of positive impulses from signal source 40. Consequently, the momentary interruptions of developer particle flow do not amount to complete stoppages and adequate quantities of the developer reach the paper web. This effect is aided by the high speed rotation of electrode structure 30, since the centrifugal forces applied to the particles tend to keep them in motion against the attraction afforded by the electrical signals applied to the electrode.

In order to prevent developer outlet 79 from being closed by contact with paper web 18, it may be desirable to offset the developer outlet at the tip of the stylus as indicated in Fig. 4. A substantially similar effect may be achieved with the construction illustrated in Fig. 5, which shows a somewhat modified embodiment of the inventive electrode structure. In this embodiment, a different stylus structure 80 is substituted for the stylus 64 shown in detail in Fig. 4. Stylus 80 includes a conductive cylindrical member 81 having a collar or shoulder element 82 disposed within mounting chamber 63 and abutting ring 69 as in the previously described embodiment. A solid conductive tip element 84 extends from cylinder 80 into contact with paper web 18. In this embodiment, however, the tip portion 84 of the stylus is not hollow and does not afford a developer conduit. Rather, a separate developer conduit member 85 is mounted on cylinder 81 as an extension thereof and is provided with an outlet opening 86 on the side thereof adjacent stylus tip element 84.

In operation, this modified embodiment is essentially similar to that set forth above in connection with Figs. 2–4. The developer particles are propelled through the interior of the electrode structure and through the cylindrical shank 81 of the stylus as indicated by arrows C. The developer particles pass through extension conduit 85 and out through opening 86 onto paper web 18 in the region immediately adjacent stylus tip 84.

Fig. 6 illustrates a further modified embodiment of an electrode structure constructed in accordance with the invention; this particular embodiment affords some additional advantages in high speed applications. The electrode structure 91 shown in Fig. 6 comprises a conductive housing 92 supported upon the shaft 37 of traversing mechanism 42; in this instance, however, it should be noted that shaft 37 extends in a direction normal to the surface of drum 10 and paper web 18 rather than being approximately tangential thereto as in the previously described embodiments. Accordingly, the face of housing 92 is approximately parallel or tangential to the paper web. The conductive housing 92 includes an inner chamber 93 and a plurality of individual stylus-mounting chambers 94 which are spaced around the periphery of the conductive housing in a regular pattern and which face the printing drum 10. Each of the stylus-mounting chambers 94 communicates with the inner chamber 93 in essentially the same manner as in the previously described embodiments. A plurality of individual styli 95 are mounted within chambers 94 and extend outwardly from the conductive housing 92 toward printing drum 10. The styli 95 are essentially similar in construction to the styli 64 described in connection with Figs. 2–4; each includes a shoulder or collar element 98 which engages a corresponding shoulder element 99 on the external side of the mounting chamber.

The individual styli 95 are axially movable with respect to conductive housing 92 and are normally biased outwardly by a plurality of individual electrically conductive biasing springs 101. As in the previously described embodiment, the spacing W between the individual styli is made approximately equal to the width of the paper web 18. The individual mounting chambers for the styli are connected to a developer conduit 108 through chamber 93, the outlet opening 109 for the developer conduit being located in a position such that the developer particles are directed primarily to the individual stylus instantaneously scanning the paper web. In addition, a plurality of baffles 110 are provided in chamber 93 to aid in directing the developer particles to the instantaneously operative stylus, thereby preventing undue loss of developer material.

The operation of the electrode structure 91 of Fig. 6 is essentially similar to that described above in connection with the preceding embodiments. The electrode structure is energized by suitable signals from image source 40 (Fig. 1) to establish a charge image on the paper web 18 as the styli scan the paper. At the same time, developer particles are impelled into the portion of chamber 93 instantaneously exposed to conduit outlet opening 109 and through the stylus instantaneously scanning the paper to develop the electrostatic image as it is formed. The resilient mounting of the styli compensates for any variations in alignment of drum 10 and electrode housing 92 and maintains the styli in light contact with the paper throughout the scanning operation. As in the previous embodiment, a shoulder 72 may be provided on the paper-supporting surface of drum 10, in this instance on dielectric layer 15, to absorb any initial shock of contact with the styli. It will be recognized that the scanning lines traced by the styli 95 upon the paper web are not linear, but rather are arcuate in configuration. If the diameter of housing 92 is made relatively large, however, with respect to the width of the paper web, the curvature of the lines is relatively small and does not interfere in any way with accurate and legible reproduction of the desired image. For most business applications, the relatively minor variation in the image introduced by the arcuate configuration of the scanning lines is of negligible effect.

Accordingly, in each of the illustrated embodiments of the invention, the image electrode structure itself serves as part of the developer conduit and deposits the developer particles in a restricted area immediately adjacent that portion of the electrode structure which forms the electrostatic image on the paper web. Each of the illustrated electrode structures affords adequate compensation for misalignment of the electrode structure with respect to the printing drum; in this respect, the construction of Fig. 6 in which the ends of the styli are essentially co-planar with the paper web is somewhat preferable to the other electrode structures. It will of course be recognized that the stylus construction of Fig. 5 may be readily incorporated in the housing 92 of the embodiment of Fig. 6 and that any of the described electrode structures may be employed with a printing drum which is either uncoated or is coated with a dielectric layer. In each instance, only a relatively small amount of developer material need be projected through the electrode structure and styli onto the paper, since the developer is deposited on the area of the paper where it is most needed. Consequently, instantaneous development of clear, sharp images is afforded and the demands upon the developer system with respect to both rate of flow and total quantity of developer are minimized.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. Apparatus for the electrostatic reproduction of an image upon a sheet of dielectric material comprising: an electrically conductive stylus; means for moving said stylus relative to said dielectric sheet to scan said sheet in accordance with a preselected pattern; a developer conduit mechanically coupled to said stylus for movement therewith with respect to said sheet and having an outlet opening of maximum dimension much smaller than the width of said sheet and located closely adjacent the end of said stylus nearest said sheet; means for energizing said stylus to establish an electrostatic charge image on said sheet; and means, independent of said energizing means, for continuously impelling developer particles through said conduit outlet opening to flood a restricted area of said sheet immediately adjacent said stylus with developer particles and form on said sheet a physical image representative of said charge image substantially simultaneously with formation of said charge image.

2. Apparatus for the electrostatic reproduction of an image upon a sheet of dielectric material comprising: a plurality of electrically conductive styli; means supporting said styli for movement relative to said dielectric sheet to scan said sheet sequentially in accordance with a preselected pattern; a developer conduit including a corresponding plurality of branches mechanically coupled to said styli for movement therewith with respect to said sheet, said branches having outlet openings of maximum dimension much smaller than the width of said sheet and located closely adjacent the ends of said styli nearest said sheet; means for energizing said styli to establish an electrostatic charge image on said sheet; and means for impelling developer particles through said conduit outlet openings to flood a restricted area of said sheet immediately adjacent the stylus instantaneously adjacent said sheet with developer particles and form on said sheet a physical image representative of said charge image substantially simultaneously with formation of said charge image.

3. Apparatus for the electrostatic reproduction of an image upon a sheet of dielectric material comprising: a plurality of electrically conductive hollow styli; means comprising a mounting hub for supporting said styli for movement relative to said dielectric sheet to scan said sheet sequentially in accordance with a preselected pattern, said hub including a central chamber communicating with each of said styli; a developer conduit, including said hub chamber and at least a part of each of said styli, having a corresponding plurality of outlet openings of maximum dimension much smaller than the width of said sheet and located closely adjacent the ends of said styli nearest said sheet; means for energizing said styli to establish an electrostatic charge image on said sheet; and means for continuously impelling developer particles through said conduit outlet openings to flood a restricted area of said sheet immediately adjacent the stylus instantaneously scanning said sheet with developer particles and form on said sheet a physical image representative of said charge image substantially simultaneously with formation of said charge image.

4. Apparatus for the electrostatic reproduction of images upon a sheet of dielectric material comprising: an electrically conductive stylus, including a cylindrical base section and an extension section of substantially smaller cross-sectional area extending from said base section toward said dielectric sheet; means for moving said stylus relative to said dielectric sheet to scan said sheet in accordance with a preselected pattern; a developer conduit, including said base section of said stylus, having an outlet opening of maximum dimension much smaller than the width of said sheet and located closely adjacent the end of said extension section nearest said dielectric sheet; means for energizing said stylus to establish an electrostatic charge image on said sheet; and means, independent of said energizing means, for continuously impelling developer particles through said conduit outlet opening to flood the portion of said sheet immediately adjacent said stylus with developer particles and form on said sheet a physical image representative of said charge image substantially simultaneously with formation of said charge image.

5. Apparatus for the electrostatic reproduction of images upon a sheet of dielectric material comprising: an electrically conductive stylus, including a cylindrical base section and a tubular extension section of substantially smaller cross-sectional area extending from said base section toward said dielectric sheet; means for moving said stylus relative to said dielectric sheet to scan said sheet in accordance with a preselected pattern; a developer conduit, including said base and extension section of said stylus, having an outlet opening of maximum dimension much smaller than the width of said sheet and located closely adjacent the end of said extension section nearest said dielectric sheet; means for energizing said stylus to establish an electrostatic charge image on said sheet; and means, independent of said energizing means, for continuously inmpelling developer particles through said conduit outlet opening to flood the portion of said sheet immediately adjacent said stylus with developer particles and form on said sheet a physical image representative of said charge image substantialy simultaneously with formation of said charge image.

6. Apparatus for the electrostatic reproduction of images upon a sheet of dielectric material comprising: an electrically conductive stylus, including a cylindrical base section and a solid extension section of substantially smaller cross-sectional area extending from said base section toward said dielectric sheet; means for moving said stylus relative to said dielectric sheet to scan said sheet in accordance with a preselected pattern; a developer conduit, including said base section of said stylus; a developer conduit extension projecting from said stylus base section adjacent said stylus extension section and having an outlet opening of maximum dimension much smaller than the width of said sheet and located closely adjacent the end of said stylus extension nearest said dielectric sheet; means for energizing said stylus to establish an electrostatic charge image on said sheet; and means, independent of said energizing means, for continuously impelling developer particles through said conduit outlet opening to flood the portion of said sheet immediately adjacent said stylus with developer particles and form on said sheet a physical image representative of said charge image substantially simultaneously with formation of said charge image.

7. Apparatus for the electrostatic reproduction of images upon a sheet of dielectric material comprising: an electrically conductive stylus, including a base section and an extension section extending from said base section toward said dielectric sheet; means for moving said stylus relative to said dielectric sheet to scan said sheet in accordance with a preselected pattern; a developer conduit, mechanically connected to said base section of said stylus for movement therewith and having an outlet opening of maximum dimension much smaller than the width of said sheet and located closely adjacent the end of said extension section nearest said dielectric sheet; means for energizing said stylus to establish an electrostatic charge image on said sheet; and means, independent of said energizing means, for continuously impelling developer particles through said conduit outlet opening to flood the portion of said sheet immediately adjacent said stylus with developer particles and form on said sheet a physical image representative of said charge image substantially simultaneously with formation of said charge image.

References Cited in the file of this patent

UNITED STATES PATENTS

| | | |
|---|---|---|
| 1,356,484 | Boltas | Oct. 19, 1920 |
| 2,097,233 | Meston | Oct. 26, 1937 |

(Other references on following page)

UNITED STATES PATENTS

| | | |
|---|---|---|
| 2,143,376 | Hansell | Jan. 10, 1939 |
| 2,173,641 | Wise et al. | Sept. 19, 1939 |
| 2,340,317 | Finch | Feb. 1, 1944 |
| 2,633,796 | Pethick | Apr. 7, 1953 |
| 2,716,048 | Young | Aug. 23, 1955 |
| 2,716,876 | Huebner | Sept. 6, 1955 |
| 2,771,336 | MacGriff | Nov. 20, 1956 |

FOREIGN PATENTS

| | | |
|---|---|---|
| 605,979 | Great Britain | Aug. 4, 1948 |